United States Patent [19]

Stone et al.

[11] Patent Number: 5,123,936
[45] Date of Patent: Jun. 23, 1992

[54] PROCESS AND APPARATUS FOR THE REMOVAL OF FINE PARTICULATE MATTER AND VAPORS FROM PROCESS EXHAUST AIR STREAM

[75] Inventors: Herman Stone, Hazleton; Gregory Rusenko, Mountaintop, both of Pa.

[73] Assignee: PMC, Inc., Sun Valley, Calif.

[21] Appl. No.: 702,413

[22] Filed: May 20, 1991

[51] Int. Cl.$^5$ .................. B01D 50/00; B01D 47/04
[52] U.S. Cl. .................................. 55/8; 55/10;
55/89; 55/90; 55/122; 55/126; 55/223; 55/259;
55/485; 55/487; 55/DIG. 42
[58] Field of Search ............... 55/7, 8, 10, 89, 90,
55/93, 94, 107, 122, 126, 134, 223, 228, 259,
260, 485, 487, 524, DIG. 42

[56] References Cited

U.S. PATENT DOCUMENTS

| | | | |
|---|---|---|---|
| 2,057,579 | 10/1936 | Kurth | 183/9 |
| 3,061,885 | 11/1962 | Rogers, Jr. | 18/48 |
| 3,250,059 | 5/1966 | Vosseller | 55/90 |
| 3,266,228 | 8/1966 | Plizak et al. | 55/426 |
| 3,458,338 | 7/1969 | Adams et al. | 55/DIG. 42 |
| 3,593,496 | 7/1971 | Merrill | 55/93 X |
| 3,672,126 | 6/1972 | Goettle | 55/259 X |
| 3,785,127 | 1/1974 | Mare | 55/233 |
| 3,800,505 | 4/1974 | Tarves, Jr. | 55/8 |
| 3,802,158 | 4/1974 | Ohle | 55/122 |
| 3,861,889 | 1/1975 | Takae et al. | 55/70 |
| 3,890,414 | 6/1975 | Ricciardi et al. | 264/45.1 |
| 3,957,464 | 5/1976 | Teller | 55/89 X |
| 4,049,399 | 9/1977 | Teller | 55/89 X |
| 4,290,783 | 9/1981 | Adams et al. | 55/89 |
| 4,345,916 | 8/1982 | Richards et al. | 55/10 X |
| 4,401,444 | 8/1983 | Teller | 55/89 X |
| 4,484,937 | 11/1984 | James et al. | 55/223 |
| 4,519,816 | 5/1985 | Clarke | 55/DIG. 42 |
| 4,537,912 | 8/1985 | Griswold | 521/53 |
| 4,631,077 | 12/1986 | Spicer et al. | 55/487 |
| 4,758,460 | 7/1988 | Spicer et al. | 55/487 X |
| 4,938,787 | 7/1990 | Simmerlein-Erlbacher | 55/94 X |
| 5,039,315 | 8/1991 | Liao et al. | 55/90 |

FOREIGN PATENT DOCUMENTS 1002769 8/1965 United Kingdom .................. 55/122

OTHER PUBLICATIONS

U.S. Ser. No. 07/674,438, filed 3/22/91 in the name of H. Stone.

Primary Examiner—Robert Spitzer
Attorney, Agent, or Firm—Davis Hoxie Faithfull & Hapgood

[57] ABSTRACT

This invention relates to a process and apparatus for removing fine particulate matter and vapors from a process exhaust air stream, and particularly those emitted during post-production curing or post-treatment of foamed plastics, such as polyurethane foam, in which the exhaust air stream is passed through a transfer duct into which is introduced a water spray in the form of a mist of fine droplets in an amount which exceeds the saturation point; thereafter the exhaust air stream is introduced into a filter chamber having a cross-sectional area that is substantially greater than that of the transfer duct, and the exhaust air stream passes through at least one, and preferably a plurality of high surface are a filters, whereby a portion of the water is removed from the exhaust air stream and collected in the filter chamber prior to the discharge of the exhaust air stream into the environment.

50 Claims, 2 Drawing Sheets

PROCESS AND APPARATUS FOR THE REMOVAL OF FINE PARTICULATE MATTER AND VAPORS FROM PROCESS EXHAUST AIR STREAM

FIELD OF THE INVENTION

This invention relates to a process and apparatus for removing fine particulate matter and vapors from a process exhaust air stream, and particularly those emitted during post-production curing or post-treatment of foamed plastics, such as polyurethane foam, and specifically the rapid cooling of polyurethane foam.

BACKGROUND OF THE INVENTION

It is known in the art of polyurethane foam manufacture that a block of freshly made open cell flexible cellular polyurethane foam can be rapidly cooled or cured by subjecting the foam blocks to an air stream alone, or a stream that contains a chemical reactant or that is saturated with water. This rapid cooling has the effect of accelerating and shortening the time for final curing of the foam and produces a block having enhanced physical properties. A further advantage of the rapid cooling process is the prevention of a scorched appearance within the interior of flexible polyurethane foam. Examples of the processes and apparatus for the rapid cooling of foam blocks are disclosed in the following: U.S. Pat. No. 3,061,885 issued Nov. 6, 1962; U.S. Pat. No. 3,890,414 issued Jun. 17, 1975; U.S. Pat. No. 4,537,912 issued Aug. 27, 1985; and application U.S. Ser. No. 07/341,138 filed Apr. 20, 1989, now abandoned in favor of FWC 07/674,438 filed Mar. 22, 1991. These disclosures are herein incorporated by reference.

It has been found that the exhaust air stream from the rapid cooling of freshly-made, uncured flexible polyurethane foam produces a dense white cloud which has the appearance of smoke when discharged into the atmospheric environment. The content of this smoke was found to be very small particles and organic vapors. In operating the rapid cooling process, a means of removing or reducing the particulate matter and vapors discharged into the atmosphere would be desirable.

Other areas of the manufacture or processing of polyurethane foam are known to produce emissions of particulate matter and vapor which are typically carried away from the production area by exhaust air streams for discharge into the atmosphere. For example, as a freshly poured cellular polyurethane foam forming composition completes its rise and assumes its final self-sustaining configuration, it emits a smoke or haze. This smoke is comprised of fine particulate matter and vapors which are emitted as the foam reaches its peak rise and thereafter during the curing period. In order to maintain the quality of the ambient air in the foam production facility, the foam production line is at least partially enclosed along its top and sides and an exhaust air stream is drawn over the reacting foam to collect any reaction byproducts which are emitted. The exhaust air stream is typically discharged through an exhaust duct and roof vent into the atmosphere.

Fine particulate matter and vapors are also generated when polyurethane foam and other foamed and solid plastics are subjected to high temperatures during manufacture and/or fabrication processing. Such processing of polyurethane foam includes heat sealing, hot wire cutting, heat compression, surface melting (such as embossing) and flame lamination. During these methods of processing polyurethane foam, toluene diisocyanate and other gaseous and solid matter are generated which are conventionally drawn away from the foam by an exhaust air stream. It would be desirable to provide an economical and effective means of removing all or a substantial proportion of the fine particulate matter and vapors from the process exhaust air stream before the exhaust air is discharged into the environment.

The fine particles and vapors emitted from the reacting foam range in size from close to zero to about five microns, and include a variety of materials. Analysis of the fine particles and vapors emitted during the rapid cooling of polyurethane foam employing water saturated air, indicates that they are generally insoluble in water, and include impurities, auxiliary blowing agents (such as methylene chloride and fluorocarbons), unreacted excess toluene (or tolylene) diisocyanate ("TDI"), TDI urea, butylated hydroxy toluene ("BHT") (an antioxidant), amines, and other organic vapors. It has been found that emissions of fine particulate matter and vapors cease within about the first hour after polyurethane foam is initially manufactured and within approximately twenty minutes after the completion of other fabrication processing involving high temperatures, such as flame lamination.

While it is recognized that such materials can present environmental dangers, the removal of the fine particles and vapors from the process exhaust air stream in which they are collected is difficult due to their dilution, to the high velocity of the exhaust air stream—which is typically 6,000 to 20,000 feet per minute—and the small size of the particles and vapors.

Various methods for removing matter from gaseous streams have been disclosed in the art.

U.S. Pat. No. 3,861,889 discloses a process for removing soluble solid dust particles from a gas stream by spraying the gas stream with a solvent in which the dust is soluble and then passing the gas stream through a foamed material which is impregnated with the solvent. The patent further discloses passing the gas stream through foam filters at relatively low velocities, preferably less than 2 meters per second.

U.S. Pat. No. 3,266,228 discloses a device for separating and removing entrained liquid from air through the use of an open-cell foam material such as a polyurethane foam.

U.S. Pat. No. 4,290,783 discloses a process for removing soluble particles, specifically urea, from an air stream by first spraying the stream with water and then passing the stream through a demister.

U.S. Pat. No. 3,250,059 discloses a method for removing solid aerosols, specifically submicron particles of $TiO_2$, from a gas stream by passing the gas stream through two sets of filters. A liquid in which the solid aerosols are insoluble is sprayed onto the first filter through a nozzle aimed in a direction concurrent to the flow of the gas stream. The liquid is employed to ensure that the solid aerosols are entrapped in the first filter.

U.S. Pat. 3,785,127 discloses a device for scrubbing a stream of air with a scrubbing liquid, e.g., water passing a gas stream through a series of screens while spraying the screens with a scrubbing liquid to facilitate the removal of small particles of minus 20 microns.

U.S. Pat. No. 2,057,579 discloses an apparatus for purifying air comprising a chamber in which baffles deflect the air so that it takes a tortuous path through the filter chamber. Liquid is sprayed against the baffle plates to remove from the flowing air relatively heavy foreign matter.

U.S. Pat. No. 3,802,158 discloses a pollution control apparatus for removing grease and smoke from an air stream. The air stream first passes through a water spray to remove large particles from the stream, following which the stream impinges upon baffles and a filter system which separate the water from the air. The filter system comprises generally, a glass wool or batting central section. Following the baffles, the stream passes through an electrostatic precipitator which removes small pollutants from the stream.

None of the methods or apparatus disclosed in these references is suitable for treating a large volume of hot and rapidly moving exhaust air stream that contains water-insoluble particulate matter and vapors emitted during the high temperature processing of polymeric materials, such as flexible polyurethane foam, in an economical manner and without special solvents.

SUMMARY OF THE INVENTION

In its broadest context, the invention is an apparatus and method for economically treating chemical process exhaust air streams to attenuate the discharge into the atmosphere of particulate matter and vapors by removal of these contaminants from the exhaust air stream. In one embodiment, the exhaust air stream containing the particulate matter and vapors is first passed through a transfer duct at a relatively high linear or volumetric flow rate and is treated by spraying water into the exhaust air stream from nozzles positioned on the interior of the transfer duct. The water is in the form of a mist of fine droplets. The volume of water added to the exhaust air stream is at least about twice the water vapor content at the saturation point, or dew point, of the air stream.

The solid particulate matter and vapors are absorbed by, or adsorbed in the water droplets and the exhaust air stream is thereby cooled and "washed" of most of these impurities. It is important that sufficient contact occur between the water droplets which have been sprayed into the transfer duct and the particulate matter and vapors to permit the latter to be entrained and removed from the air stream. This contact can be achieved by adjusting the length of the transfer duct or the linear flow rates to control the contact time, or by incorporating a static mixer, baffles, or the like in the transfer duct to increase the turbulent flow. It has been found that satisfactory results are obtained if the length of the transfer duct between the position where the spray nozzles introduce the water into the exhaust air stream and the filter is at least ten diameters. Preferably the distance from the spray nozzles to the filters is substantially greater than ten diameters.

The transfer duct is connected to a filter chamber having a cross-sectional area which is sufficiently greater than that of the transfer duct to reduce the linear flow rate (velocity) to about 10% of that in the transfer duct, i.e., the cross-sectional area of the filter chamber should be at least ten times that of the transfer duct. The type and arrangement of the filters is very important to the successful removal of the water-entrained particulate matter and vapors from the exhaust air stream. Where the system has been used with the treatment of an exhaust air stream from the rapid cooling of flexible polyurethane foam, the type and arrangement of the filters has been found to be critical to obtaining the maximum attenuation and removal of particulate matter and vapors from the exhaust air stream discharged into the environmental atmosphere.

The exhaust air stream and water droplets carrying the fine particles and vapors, passes through one or more fine filters which collect approximately 50% of the moisture introduced into the exhaust air stream. With the water collected from the exhaust air stream, most, if not all of the emitted fine particles and vapors are removed from the exhaust air stream which is then allowed to pass into the atmospheric environment.

A substantial amount of water in excess of the vapor at the saturation point for the exhaust air stream is introduced into the exhaust air stream in the form of a mist of fine droplets prior to its contact with the filters. The excess moisture ensures that the filters remain in a fully wetted condition as a result of the water droplets which coalesce as they impinge upon the filter as the water saturated exhaust air stream passes through.

In the practice of the invention in connection with the rapid cooling and post-production cooling of foam, where large volumes of cool air are passed through the hot foam mass after it has completed its rise, the discharge of particulate matter can also be reduced by reducing, to the extent practicable the chemicals in the raw materials which are found in the untreated exhaust gas stream. The content of chemical components such as unreacted TDI can be adjusted in the formulation to minimize their presence in the finished foam block. Reduction of solids, such as BHT, can be attained by replacing or reformulating the raw materials, and non-reacting organics can be modified chemically so that they react with the foam-forming constituents and thereby remain in the block. These modifications in the foam formulation and to the foam-forming constituents represent a preferred embodiment of the invention.

In a further specific embodiment adapted to the rapid cooling of polyurethane foam blocks, water is sprayed into an exhaust air stream that passes through the blocks during which particulate matter and vapors are emitted by the foam. The amount of water entering the exhaust air stream prior to contact with the hot foam blocks is at or very near the saturation point. The moisture laden air exiting from the block is drawn through an exhaust chamber and is then passed into a transfer duct for further treatment as described above. The methods and apparatus for the initial treatment of the foam block is described in more detail in copending application Ser. No. 07/674,438 filed Mar. 22, 1991, owned by a common assignee, the disclosure of which is herein incorporated by reference. In accordance with the present invention, more water is added to the exhaust air stream prior to its contact with the filters, i.e., as it passes through the transfer duct, to ensure that a substantial portion of the fine particulate matter becomes entrained in water.

In yet another embodiment of the process and apparatus of the invention, the exhaust air stream is passed over a polymeric material, such as flexible polyurethane foam, during a high temperature processing operation which generates particulate matter and vapors. The exhaust air stream passes through an exhaust hood or chamber positioned above the processing zone and water in the form of a mist of fine droplets is sprayed into the exhaust air stream. The exhaust air stream and water droplets then pass into a transfer duct, where it is treated as described above.

DESCRIPTION OF THE INVENTION

The invention will be further described by reference to the drawings. In a preferred embodiment of FIG. 1, a freshly formed block of open-cell polyurethane foam I that is to be subjected to a rapid cooling process is placed on top of a porous grid 4 which separates the foam 1 from an exhaust chamber 5. In the continuous processing of freshly made foam, grid 4 can be a section of a metal link conveyor belt. In a preferred embodiment, a non-porous fabric belt 51 is positioned at opposite edges of the open link conveyor to seal the exhaust chamber along outwardly extending flanges 53 and extends under the outer edges of the block to complete the seal. Exhaust chamber 5 is further connected to transfer duct 7, described in more detail in FIG. 2, through which is drawn an exhaust air stream 9 by means of a downstream exhaust fan or the like, which will be described in more detail below. The exhaust air stream 9 contacts the upper surface of the foam block 1 and is drawn through the block to exit from the surface that is supported by porous grid 4. Fine particulate matter and vapors emitted from the foam mass are carried along by the exhaust air stream.

Figure 1:
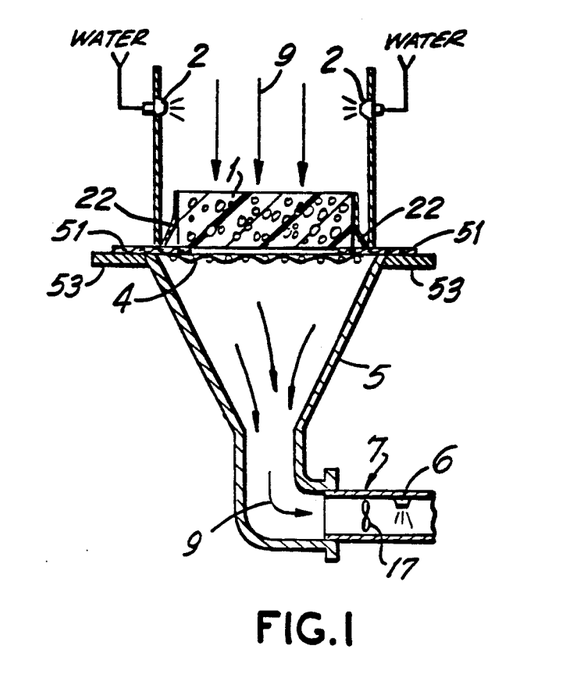
FIG. 1 is a cross-sectional view of one embodiment of an apparatus for treating a block of polyurethane foam to rapidly cool the block.

In the preferred practice of the rapid cooling process, which does not form a part of the present invention, all of the exhaust air stream flows directly through the foam block 1, through the porous grid 4, and into the exhaust chamber 5. In order to achieve this result the top and bottom skin of the foam must be removed, and the sides sealed, as with plastic film 22, or the like, to prevent air from being drawn past the block, or through its side walls. It is known in the prior art process for rapid cooling foam to direct an air stream through the foam block, which air stream is heavily laden with moisture from just below to above the saturation point. As shown in FIG. 1, nozzles 2 are positioned proximate the foam block for the purpose of directing a spray of water into the air stream prior to its contact with the foam. In another embodiment, water in the form of a mist can be sprayed directly on the exposed surface of the block. In the present invention, it is generally necessary to add further amounts of water to the exhaust air stream as it passes through the transfer duct, such as by nozzle 6, which can be a single outlet or a plurality of nozzles spaced radially or longitudinally.

A principal feature of the present invention is the introduction into the exhaust air stream of a volume of water in the form of a mist of fine droplets which greatly exceeds the saturation point of the air stream. The volume of moisture to be added to the exhaust air stream is at least about twice the volume necessary to maintain the saturation or dew point of the exhaust air stream. The saturation point will depend on the temperature of the air stream, which typically will vary between 80° F. and 225° F., and at high temperatures, a greater volume of water will have to be added. For example, the water vapor concentration of saturated air at 102° F. is twice that of air at 80° F. Further, a greater volume of water will be necessary when the volumetric flow rate of the exhaust air is increased. The temperature and volume of the water to be added to the exhaust air stream should be such that the exhaust air stream is cooled substantially to room temperature before it is discharged into the atmosphere. Where moisture is added in the transfer duct 7, such as by nozzle 6, the spray pattern and nozzle configuration should be adapted to ensure that the mist of water droplets is thoroughly dispersed in the exhaust air stream 9. In a preferred embodiment, a plurality of nozzles located in the region of nozzle 6 (downstream of exhaust fan 17), are positioned at about 90° intervals around the interior of the transfer duct. Such dispersing can be further ensured through the use of mixing vanes or static mixers 71 positioned in the transfer duct 7 as shown in FIG. 2.

Water can also be introduced into the exhaust air stream 9 as it passes through the transfer duct 7 by way of one or more nozzles displaced from the inner surface of the duct 7 and positioned directly in the exhaust air stream. In a preferred embodiment of the invention, water is simultaneously introduced into the air stream through nozzles positioned above the foam and in duct 7.

FIG. 1 illustrates fan 17 positioned just beyond the exhaust chamber 5 to pull air through the foam 1 and push it into the transfer duct 7. In the embodiment in which water is introduced into the air stream in the transfer duct 7, the nozzle is advantageously placed downstream of and proximate fan 17 to ensure adequate dispersion of the water in the exhaust air stream 9 to thereby maximize the cooling of, and mixing with, the exhaust air stream.

Figure 2:
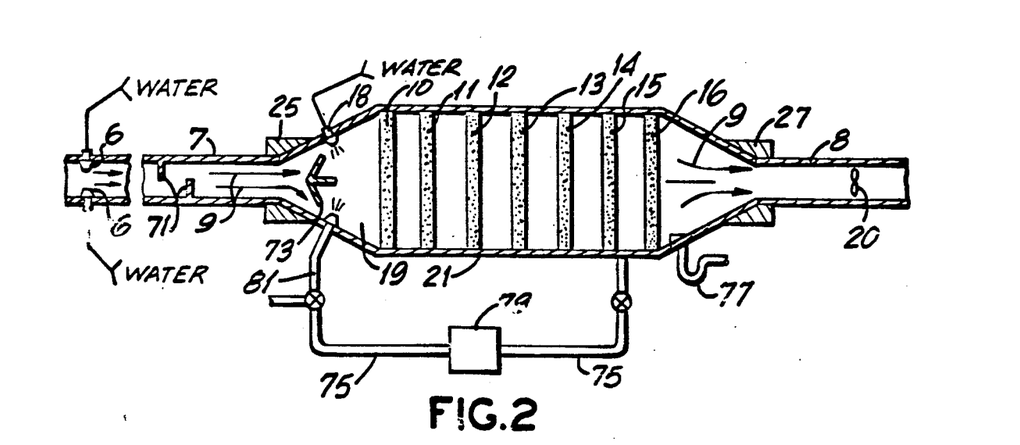
FIG. 2 is a cross-sectional view of one embodiment of apparatus for treating the exhaust air stream obtained in FIG. 1.

With reference to FIG. 2 there is illustrated transfer duct 7 and filter chamber 21, having inlet 25 and outlet 27. The filter chamber 21 is adapted to receive one or more filter units at spaced positions. In the embodiment of FIG. 2, seven filter positions, identified as 10 through 16 are shown. The water saturated exhaust air stream 9 passes through each of the filter units prior to being discharged into the atmospheric environment through exhaust duct 8. It has been found that both the introduction of specified volumes of water and the use of a sufficient number of filters having specified characteristics necessary to remove about fifty percent of the water from the exhaust air stream are important to the successful practice of the present invention.

The velocity of the exhaust air stream 9 as it passes through the transfer duct 7 should generally be in the range of from about 2,000 ft/min. to 9,000 ft/min., although the velocity can be as high as 20,000 ft/min. The dimensions of the filter chamber 21 should be sufficient to reduce the linear velocity of the exhaust air stream 9 from several thousand feet per minute through the transfer duct 7 to less than a thousand feet per minute through the filter chamber 21, and preferably to about several hundred feet per minute. This will require a cross sectional area of the filter chamber 21 that is at least ten times the cross sectional area of the transfer duct 7. For example, it has been found in pilot operations employing a transfer duct with a 33 sq. inch cross section and a filter chamber with a cross section of about 576 sq. inches that the linear flow rate can be reduced from about 8,000–9,000 ft. per minute in the transfer duct to 1/17–1/20 of such velocity in the filter chamber, i.e., to about 400-550 ft. per minute. The velocity of the exhaust air stream through the filter chamber should be as low as possible while maintaining continuous flow through the filters.

As the exhaust air stream 9 passes from the transfer duct 7 it passes through a zone of expansion 19 which connects with the filter chamber 21. Unless the zone of expansion 19 is long and gradual, and the filter chamber 21 has a cross sectional area much larger than that of the transfer duct 7, the exhaust air stream 9 does not spread sufficiently to utilize more than the central region of the filter 10. Thus, vanes, mixers, small fans, or other means, illustrated generally at 73, can be employed in the zone of expansion 19 to uniformly spread the exhaust air stream 9 as it enters the filter chamber 21.

As shown in FIG. 2, filter chamber 21 can also optionally contain one or more auxiliary spray nozzles 18 positioned upstream of the filter units. Nozzle 18 can be surface mounted or positioned inwardly in the path of the air stream passing through expansion zone 19. Preferably water added in the filter chamber 21 is only used to supplement water already added directly to the foam mass 1 and in the transfer duct 7, as illustrated in FIG. 1. Better results are obtained when the exhaust air stream 9 contains the desired volume of water prior to entering the filter chamber 21.

Filter chamber 21 is adapted to receive one or more filter units at any of the positions designated as 10 through 16. Preferably, the filters are organic polymeric foam filters, such as VELVE® foam, produced in accordance with U.S. Pat. Nos. 3,748,288 and 3,884,848 available from PMC, Inc. So-called standard filters, such as furnace filters, glass cloth or metal mesh filters (such as aluminum mesh) have been found to be less effective, or totally ineffective in the practice of the invention. An electrostatic filter can also be used in addition to, or in place of, an organic filter. Since the filters retain a substantial portion of the solid matter removed from the exhaust air stream, it is necessary to periodically clean or replace the filters. Surprisingly, it has been found that the electrostatic filter performs more efficiently if it is also kept in a thoroughly wetted condition. The volume of water to be sprayed into the exhaust air stream will depend in part on the combination of filters (number, thickness, placement, and mesh or pore size) positioned in the filter chamber. Although the filters can be positioned horizontally (not shown), the filters are preferably vertically aligned to facilitate the downward flow of water from each of the filter units and its collection and discharge from the chamber.

The volume of water necessary is inversely proportional to the total surface area of the filters. Generally, more water will be needed with filters of lower mesh or pore count, and when fewer filters are employed. The volume of water added is preferably approximately at least twice the volume required to maintain air saturation. In a preferred embodiment, sufficient water is added so that the surface of the transfer duct 7 can be touched which will ensure that the exhaust air stream 9 is cooled substantially to the ambient temperature as well. At least fifty percent of the water added to the coolant stream is removed from the exhaust air stream prior to the exhaust air stream's exit from the filter chamber 21 through the exhaust duct 8. An auxiliary exhaust fan 20 can be used to reduce the flow resistance effect of the filters, and ensure that the exhaust air stream 9 is discharged from the chamber and into the outer atmosphere.

The water condensed from the exhaust air stream can be drained from the filter chamber, either continuously or intermittently through valved drain line 75, or through the use of a water trap 77, or other suitable means. Water drained from the filter chamber can be recycled through appropriate means 79 and pumps (not shown) to one or more of the spray nozzles, such as through piping 81, thereby conserving water. It may be necessary to filter, or otherwise treat the recycled water to remove particulates and other impurities which would adversely affect the system.

Figure 3:
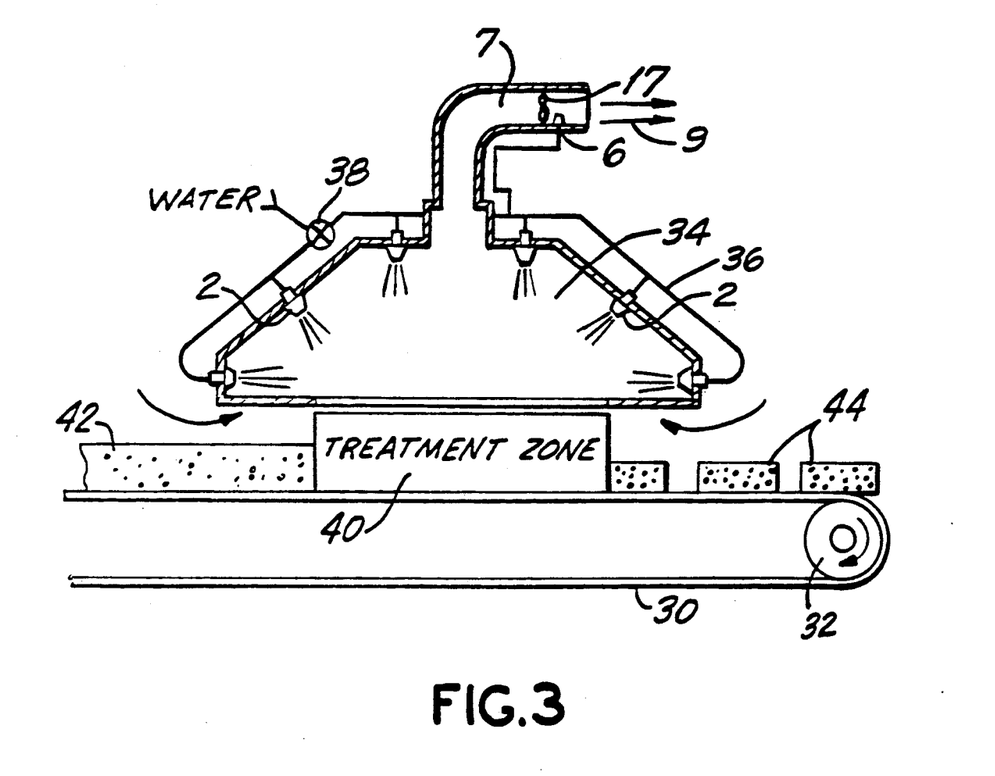
FIG. 3 is a side elevational view, partly in section, of another embodiment of an apparatus for practicing the invention in the continuous processing of polymeric articles.

FIG. 3 is a side elevational view, partly in section, illustrating a further embodiment of the invention adapted for use with a typical continuous processing operation which generates particulate matter and vapors from the high temperature processing of plastic materials. For purposes of this illustration a continuous conveyor 30, powered by drive unit 32 moves foamed plastic material 42, such as flexible polyurethane foam, into a treatment zone 40. The foam is subjected to high temperature processing such as hot wire cutting, heat compression and embossing, to produce the desired finished product 44. During the course of this processing, particulate matter and vapors are emitted from the material and are drawn up into exhaust hood or chamber 34 by an exhaust fan 17 or other means downstream of transfer duct 7. Water spray nozzles 2 are positioned on the interior of exhaust chamber 34, or within the transfer duct 7 at position 6, and connected by conduits 36 through control valve 38 to a source of pressurized water (not shown).

The exhaust air stream 9 is drawn into exhaust chamber 34 from the surrounding ambient air to collect the emitted particulate matter and vapors. Water is sprayed into the exhaust air stream in the form of a mist of fine droplets which are carried along by the air stream. To avoid corrosion and the draining of water back into the treatment zone 40, the addition of water can be limited to points within the transfer duct such as at position 6 or even further downstream.

The exhaust air stream and water droplets entering transfer duct 7 are then treated in accordance with the same process described in connection with FIG. 2, and employing the same apparatus as previously described. A substantial portion of the particulate matter and vapors are removed from the exhaust air stream prior to its discharge into the atmosphere.

The following test results demonstrate the efficiency of the process and apparatus of the invention in removing particulate matter and vapors generated during the rapid cooling of flexible polyurethane foam blocks. Blocks of newly manufactured, open-cell polyurethane foam, with maximum dimensions of 60" by 84" by 40" high, were placed in an apparatus having the general configuration as illustrated in FIG. 1. The exhaust air stream was passed through the foam block I and into an exhaust chamber corresponding to chamber 5 and then into a transfer duct 7 which had a diameter of 6.5 inches.

The transfer duct 7 was connected to a rectangular filter chamber (corresponding to filter chamber 21 in FIG. 2) with dimensions of 25" by 25" by 25". The exhaust duct 8 had a diameter of 6.5 inches. The filter chamber had five slots designed to accommodate one-inch thick filters (corresponding generally to positions 10, 11, 13, 14, and 16 in FIG. 2). The filter chamber also had two two-inch slots (corresponding to positions 12 and 15 in FIG. 2). The two-inch slots were designed to secure an optional air bag filter or an electrostatic filter.

The linear flow rate of the exhaust air stream through the transfer duct 7 was approximately 8,000-9,000 ft/min. The velocity of the air stream through the filter chamber was about 1/17-1/20 of the linear flow rate through the transfer duct. Exhaust fans were employed to draw the exhaust air stream through the foam block, into the transfer duct, and, ultimately, to discharge the air through exhaust duct 8 The exhaust fans were allowed to run for about 60-180 seconds, which was the time necessary to cool the foam mass center to about room temperature. Excess water was introduced into the exhaust air stream 9 through spray nozzles placed in the transfer duct at a position approximated by that of nozzle 6 in FIG. 1.

As the following experimental results will show, a preferred embodiment of the invention includes an initial coarse polyurethane foam filter i.e., 15 ppi, followed by one or more finer mesh foam filters ranging from 40 ppi to 100 ppi. In place of, or in addition to, the finer mesh filters a high surface area mechanical filter may be used, such as an electrostatic filter or a furnace filter. For the following results, a "Newtron" model electrostatic filter was used from McMaster-Carr of New Brunswick, N.J. The filter was 20"×20" and two inches thick. The foam filters were about 24"×24", and one inch thick filters were found to be preferable to 0.5 inch thick filters. Best results were obtained when the filter sequence was an initial 15 ppi foam filter followed by three 80 ppi foam filters. The introduction of an excess amount of water is critical to ensure that the exhaust air stream remains super-saturated at all times, and that the surfaces of the filters remain wetted with water coalesced from the exhaust air stream.

In the Table that follows, the filters were placed in the positions corresponding to positions 10-16 of FIG. 2, except that position 12 Was not used. All filters had a thickness of one inch, except that the electrostatic filter, where used, had a thickness of two inches. The designation "E" indicates use of the electrostatic filter, while an "X" means that no filter was used in that position for that run. "FF" indicates use of a furnace filter. Other than the electrostatic filter, all filters Were of polyurethane foam.

The volume flow rate of the water used is also indicated in milliliters per minute (ml/min). Up to three nozzles could be used during a given test run, and each could be activated for varying periods during the run. Fogging and spray nozzles performed equally well. The nozzles employed to generate the following results were obtained from Spraying Systems Co., Wheaton, Ill.

The degree to which a particular arrangement was successful in attenuating the discharge of fine particulate matter and vapors was determined by visual observation of the relative cloudiness, or cloud density, of the exhaust air stream as it passed beyond the filter chamber 21 and exited the exhaust duct 8. A high degree of cloudiness indicated a lower level of particle and vapor removal. The degree of cloudiness (or filtration), from worst to best, is as follows: very large cloud—large cloud—medium cloud—small cloud—slight cloud—no cloud. In the following Table, the entry "2nd Block" means the same filters were used again without replacement or washing, and a second block of freshly manufactured foam was treated following the first test with the new, or washed, filters. The entry "3rd Block" means a third block of fresh foam was treated after the second block, again using the same filters, without replacement or washing after processing of the first and second blocks. Tests employing no water, or without filters are for comparative purposes, and are identified with an asterisk (*).

TABLE

| Run | Filter Positions | | | | | | Water Flow (ml/min) | Result Observed |
|---|---|---|---|---|---|---|---|---|
| | 10 | 11 | 13 | 14 | 15 | 16 | | |
| 1* | X | X | X | X | X | X | 0 | Large amount of smoke entire 2 minute run |
| | | | 2" thick - 80 ppi (no filter chamber; filter placed in transfer duct) | | | | | |
| 2* | 15 ppi | 80 ppi | X | X | X | X | | |
| 2A* | | | 1st Block | | | | 0 | Slight cloud entire 90 sec. |
| 2B* | | | 2nd Block | | | | 0 | Very large cloud entire 90 sec. |
| 3* | FF | 80 ppi | 80 ppi | 80 ppi | X | X | 0 | Reduction in smoke for 20 sec. then large cloud rest of 90 sec. |
| 4* | 15 ppi | X | X | X | E | X | 0 | Very large cloud entire 90 secs. |
| 5 | 15 ppi | 80 ppi | 80 ppi | X | E | X | 545 (for 60 sec. of 90 sec.) | Slight cloud entire 90 sec. |
| 6 | X | X | X | X | X | X | 545 (for 60 sec. of 90 sec.) | Very large cloud entire 90 sec. |
| 7A | 15 ppi | 80 ppi | 80 ppi | X | E | X | 127.5 | Medium cloud most of 90 sec. |
| 7B | | | 2nd Block | | | | 127.5 | Large cloud most of 90 sec. |
| 8A | 15 ppi | 80 ppi | 80 ppi | X | E | X | 460 1035 | Small cloud. No cloud. |

TABLE-continued

| Run | Filter Positions 10 | 11 | 13 | 14 | 15 | 16 | Water Flow (ml/min) | Result Observed |
|-----|----|----|----|----|----|----|----|----|
|     |    |    |    |    |    |    | 3195 | No cloud. |
|     |    |    |    |    |    |    | 0    | Large cloud. |
| 8B  |    |    | 2nd Block |    |    |    | 1035 | Slight cloud. |
|     |    |    |    |    |    |    | 2160 | No cloud. |
|     |    |    |    |    |    |    | 0*   | Large cloud. |
| 8C  |    |    | 3rd Block |    |    |    | 1035 | Slight cloud. |
|     |    |    |    |    |    |    | 2160 | No cloud. |
|     |    |    |    |    |    |    | 0*   | Large cloud. |
| 9   | 15 ppi | 45 ppi | 45 ppi | X | X | 45 ppi | 3195 | Cloud disappears after 2 minutes |
|     |    |    | 2nd Block |    |    |    |      | Cloud disappears after 90 secs. |
| 10A | 15 ppi | X | 80 ppi | X | X | 80 ppi | (Filters pre-wet for 30 sec.) |   |
|     |    |    |    |    |    |    | 0*   | Small cloud after 60 sec. |
|     |    |    |    |    |    |    | 460  | Small cloud not removed. |
|     |    |    |    |    |    |    | 1035 | Small cloud reduced to slight cloud. |
|     |    |    |    |    |    |    | 3195 | No cloud by end of 90 sec. run. |
| 10B |    |    | 2nd Block |    |    |    | (No pre-wetting) | |
|     |    |    |    |    |    |    | 0    | Medium cloud. |
|     |    |    |    |    |    |    | 460  | Medium cloud. |
|     |    |    |    |    |    |    | 1035 | Medium cloud. |
|     |    |    |    |    |    |    | 3195 | Eliminated cloud entirely after 60 sec. at this flow rate. |
| 11A | 15 ppi | 15 ppi | X | 15 ppi | X | 15 ppi | Pre-wet filters for 60 sec.) | |
|     |    |    |    |    |    |    | 0    | Large cloud. |
|     |    |    |    |    |    |    | 460  | Large cloud. |
|     |    |    |    |    |    |    | 1035 | Large cloud. |
|     |    |    |    |    |    |    | 3195 | Eliminated cloud entirely after 60 sec. at this flow rate. |
| 11B |    |    | 2nd Block |    |    |    | (No pre-wetting) | |
|     |    |    |    |    |    |    | 0    | Large cloud. |
|     |    |    |    |    |    |    | 460  | Large cloud. |
|     |    |    |    |    |    |    | 1035 | Large cloud. |
|     |    |    |    |    |    |    | 3195 | Eliminated cloud entirely after 60 sec. at this flow rate. |

Based on the operating conditions and result observed in the above runs can be concluded:

| Run | Comment |
|-----|---------|
| 1*  | A single dry filter of relatively fine cell size placed in the transfer duct is ineffective. |
| 2*  | Combination of a coarse and fine dry filters provides some reduction on first block, but ineffective when second block treated. |
| 3*  | The furnace filter failed during test and three dry fine filters were ineffective. |
| 4*  | A combination of dry coarse filter and electrostatic filter were ineffective. |
| 5   | The addition of water and a combination of one coarse and two fine filters and the electrostatic filter produced significant reduction in cloud. |
| 6   | The use of water alone without filters was ineffective. |
| 7   | The use of the same combination of filters as run 5, but only about 25% of the water resulted in a relatively larger cloud during treatment of the first block; during the treatment of the second block the electrostatic filter failed and the cloud increased further. |
| 8   | This series establishes the increased effectiveness and improvement in the process that is attained with increased addition of water, even when a second and third block are treated without cleaning the filters. |
| 9   | No electrostatic filter; larger pore filters less effective but high volume of water eventually eliminated cloud; similar effect on second block. |
| 10  | No water added initially, but filters pre-wet with substantial reduction; increased volumes of water eventually eliminated cloud; similar effect on |

-continued

| Run | Comment |
|---|---|
| | second block |
| 11 | A series of four coarse (15 ppi) filters, when pre-wet had no effect; increased volume of water eventually eliminated cloud; similar effect on second block. |

In the continuous practice of the invention, a flexible open-cell polyether foam-forming composition is poured onto a polyethylene bottom film and reacts while being conveyed in a moving sidewall conveyor with sidewalls spaced at 72 inches. A polyethylene film is also unrolled on the top of the continuous foam block which is about 40 inches high. After the foam has completed its rise and attained a stable self-sustaining configuration, the top and bottom films are stripped off, thereby removing the impermeable outer skin of the block and exposing the interior open cell foam structure through which air readily passes. After leaving the standard conveyor, the continuous foam block is passed onto, and supported by, a moving metal link conveyor 4 adapted to permit not only the free passage of air, but also to permit pieces of loose foam which had been torn free by the removal of the film from the top and bottom of the block to drop away before the foam block enters the cooling section of the apparatus. A series of 2000 cfm vacuum pumps 17 draw ambient air down through the block 1 and into exhaust chamber 5. Fabric strip conveyors 51 on either side of link conveyor 4 extend under the bottom edges of block 1 to seal the inwardly projecting flange of exhaust chamber 5. The cooling of the interior of the block proceeds rapidly from an initial temperature of 340°-360° F. to a final temperature of about 110° F. Water is optionally sprayed onto the upper surface of block I through nozzles 2 positioned above the conveyor to further accelerate the cooling of the interior of the block. The exhaust air stream discharged from exhaust fan 17 passes into transfer duct 7 having a 6.5 inch diameter. Water is sprayed into the exhaust air stream at an essentially horizontal run of duct 7, and the water-saturated exhaust air stream is passed into a 4'×4' filter chamber fitted with three filter supports, each containing one 15 ppi foam filter and three 80 ppi filters. In a first comparative run, air was drawn through the freshly made foam blocks that had been prepared as described above, and without any further treatment, was discharged directly into the atmosphere through duct 7 to produce a dense and persistent white cloud of particulate matter and vapors.

In a subsequent run made in accordance with the invention, the water spray is introduced through nozzles in duct 7, and the saturated exhaust air stream is passed through the filter chamber 21 equipped with a series of filters as described above. The air discharged from the filter chamber is substantially free of the white smoke or cloud which previously had been produced.

It will be apparent that various modifications may be made by one skilled in the art that are within the scope of the present invention and of the claims which follow.

We claim:

1. A method of attenuating the discharge into the atmospheric environment of fine particulate matter and vapors emitted from processed polyurethane foam which comprises:

(a) passing an exhaust air stream proximate at least one surface of the polyurethane foam;

(b) collecting the fine particulate matter and vapors emitted from the foam in the exhaust air stream;

(c) passing the exhaust air stream into an exhaust chamber;

(d) passing the exhaust air stream from the exhaust chamber into a transfer duct having a cross-sectional area in the direction of flow that is smaller than the cross-sectional area of the exhaust chamber to thereby increase the flow rate of the exhaust air stream;

(e) spraying water in the form of a mist of fine droplets into the exhaust air stream in an amount which exceeds the saturation point of the exhaust air stream from at least one position along the interior of the transfer duct;

(f) passing the moisture-saturated exhaust air stream from the downstream end of the transfer duct into a filter chamber having a cross-sectional area in the direction of flow greater than the area of the transfer duct to substantially reduce the flow rate of the exhaust air stream through the filter chamber;

(g) passing the exhaust air stream containing water droplets through at least one high surface area porous filter medium that is positioned in the filter chamber transverse to the direction of flow of the exhaust air stream to thereby coalesce a portion of the water droplets onto the filter medium;

(h) discharging from the filter chamber the water which has been removed from the exhaust air stream; and (i) passing the exhaust air stream from the filter chamber into the atmospheric environment.

2. The method of claim I where the exhaust air stream contacts at least one surface of the processed polyurethane foam.

3. The method of claim 2 where the exhaust air stream passes through the interior of the foam.

4. The method of claim 3 which includes the step of spraying water in the form of a mist of fine droplets into the exhaust air stream before it contacts the surface of the foam.

5. The method of claim 3 which includes the step of spraying water directly onto at least one surface of the foam.

6. The method of claim 4 where the water is sprayed from a plurality of nozzles located upstream of the foam.

7. The method of claim 1 where the exhaust air stream passes through at least three porous filters in the filter chamber.

8. The method of claim 7 where the filters comprise polymeric foam.

9. The method of claim 8 where the filters comprise an open-celled polyurethane foam of varying porosity.

10. The method of claim 9 where the exhaust air stream first passes through a highly porous coarse filter and then passes through a plurality of relatively finer filters of high porosity.

11. The method of claim 10 where the exhaust air stream first passes through a filter which has a cell size of about 15 ppi and then through at least one filter having a cell size in the range of from 40 ppi to 100 ppi.

12. The method of claim 7 which includes the step of passing the exhaust air stream through an electrostatic filter.

13. The method of claim 1 where the flow rate of the exhaust air stream through the transfer duct is from about 2000 to 9000 feet per minute.

14. The method of claim 1 where the flow rate of the exhaust air stream through the filter chamber is less than about 1000 feet per minute.

15. The method of claim 1 where the amount of water sprayed into the exhaust air stream is sufficient to maintain the at least one filter in a wetted condition.

16. The method of claim I where water is sprayed in the form of a mist of fine droplets from at least one position on the interior of the filter chamber.

17. The method of claim I which includes the further step of spraying water in the form of a mist of fine droplets into the exhaust air stream as it passes through the exhaust chamber.

18. The method of claim 17 where the water is sprayed from a plurality of nozzles positioned on the interior surface of the exhaust chamber.

19. The method of claim 1 which includes the further step of recycling at least a portion of the water discharged from the filter chamber and spraying it into the exhaust air stream.

20. The method of claim 19 where the recycled water is treated to remove impurities before again being sprayed into the exhaust air stream.

21. The method of claim 1 where approximately fifty percent of the water sprayed into the exhaust air stream is discharged from the filter chamber.

22. The method of claim 1 which is practiced as part of the continuous processing of polyurethane foam.

23. The method of claim 1 where the polyurethane foam is subjected to a flame laminating process.

24. The method of claim 1 where the polyurethane foam is subjected to a hot wire cutting process.

25. A method of attenuating the discharge into the environment of fine particulate matter and vapors emitted from processed polyurethane foam and accelerating the curing of the foam, which method comprises:
 (a) directing an exhaust air stream against a first surface of the polyurethane foam;
 (b) spraying the first surface of the polyurethane foam with water in the form of a mist of fine droplets and in an amount which initially exceeds the saturation point of the exhaust air stream;
 (c) passing the exhaust air stream through the polyurethane foam to thereby entrain the fine particulate matter and vapors in the water droplets;
 (d) passing the exhaust air stream and water droplets from the downstream side of the polyurethane foam into a transfer duct;
 (e) spraying water in the form of a mist of fine droplets into the exhaust air stream from at least one position on the interior of the transfer duct;
 (f) passing the exhaust air stream and water droplets from the downstream end of the transfer duct into a filter chamber having a cross-sectional area in the direction of flow greater than the area of the transfer duct to thereby reduce substantially the flow rate of the water saturated exhaust air stream through the filter chamber;
 (g) passing the exhaust air stream through at least one porous filter medium which is positioned in the filter chamber transverse to the direction of flow to thereby coalesce on the filter medium at least a portion of the moisture in the exhaust air stream;
 (h) collecting the water from the base of the filter medium in the bottom of the filter chamber; and
 (i) passing the exhaust air stream from the filter chamber into the atmospheric environment.

26. The method of claim 25 where the amount of water sprayed onto the first surface of the polyurethane foam is sufficient to cool the exhaust air stream exiting from the downstream side of the polyurethane foam to a temperature in the range from 80° to 100° F.

27. The method of claim 25 where the amount of water sprayed onto the first surface of the polyurethane foam is sufficient to cool the exhaust air stream discharged into the atmosphere to approximately the ambient temperature.

28. The method of claim 25 where the volumetric flow rate of the exhaust air stream in the filter chamber is about 0.05 to 0.5 of the flow rate in the transfer duct.

29. The method of claim 28 where the flow rate in the filter chamber is about 0.1 of the flow rate in the transfer duct.

30. The method of claim 29 where the flow rate of the exhaust air stream through the transfer duct is from about 2000 to 9000 feet per minute.

31. Apparatus for removing from an exhaust air stream fine particulate matter and vapors emitted during processing of polyurethane foam comprising:
 (a) a transfer duct adapted to receive an exhaust air stream containing the fine particulate matter and vapors emitted from the processed polyurethane foam, the transfer duct having a given cross-sectional area;
 (b) at least one nozzle positioned on the interior of the transfer duct and adapted to spray water in the form of a mist of fine droplets into the exhaust air stream;
 (c) a filter chamber having an inlet adapted to receive the downstream end of the transfer duct and an outlet, and adapted to receive a plurality of filters positioned transverse to the direction of flow of the exhaust air stream, the cross-sectional area of the filter chamber being substantially greater than the cross-sectional area of the transfer duct so that the linear velocity of the exhaust air stream in the filter chamber is from 0.5 to 0.05 of the linear velocity of the exhaust air stream in the transfer duct;
 (d) a plurality of high surface area organic filters positioned transversely in the filter chamber;
 (e) an exhaust duct adapted to mate with the outlet of the filter chamber for discharging the exhaust air stream into the atmosphere; and
 (f) means adapted to move the exhaust air stream through the transfer duct and filter chamber.

32. The apparatus of claim 31 where the filters comprise open-celled polymer foam.

33. The apparatus of claim 31 which further comprises an electrostatic filter.

34. The apparatus of claim 31 wherein the filters comprise a coarse foam filter and at least one relatively finer foam filter.

35. The apparatus of claim 34 wherein the coarse foam filter has a cell size of about 15 ppi and at least one filter has a cell size in the range of from 40 ppi to 100 ppi.

36. The apparatus of claim 31 wherein the cross-sectional areas of the filter chamber and the transfer duct are such that the flowrate of the exhaust air stream in the transfer duct is from about 2,000 feet per minute to 9,000 feet per minute and is less than about 1000 feet per minute in the filter chamber.

37. The apparatus of claim 31 which further includes an orifice for removing water from the bottom of the filter chamber.

38. The apparatus of claim 37 which further comprises means for recycling water removed from the filter chamber and for spraying the recycled water into the exhaust air stream.

39. The apparatus of claim 31 which includes a plurality of nozzles that are positioned to spray water into the interior of the transfer duct.

40. The apparatus of claim 31 where the at least one spray nozzle is mounted on the interior surface of the transfer duct.

41. The apparatus of claim 31 where the at least one spray nozzle is displaced from the interior surface of the transfer duct to a position in the exhaust air stream.

42. The apparatus of claim 31 which further includes diverter means positioned in the transfer duct adapted to mix the exhaust air stream and the water droplets.

43. The apparatus of claim 42 where the diverter means is an inline static mixer.

44. The apparatus of claim 42 where the diverter means comprises at least one baffle.

45. The apparatus of claim 31 where the transfer duct is circular and the length of the transfer duct between the at least one spray nozzle and the filter chamber is at least ten times the diameter of the transfer duct.

46. The apparatus of claim 31 which further includes an exhaust chamber communicating with the upstream end of the transfer duct which exhaust chamber comprises an air permeable support member for the foam.

47. The apparatus of claim 46 in which the air permeable support member is a section of a moving metal link conveyor.

48. The apparatus of claim 47 which further includes air impermeable fabric strip conveyors extending laterally along opposite edges of the metal link conveyor and extending under the foam being processed.

49. The apparatus of claim 48 which further comprises an exhaust fan located downstream of the filter chamber.

50. The apparatus of claim 48 which further comprises an exhaust fan located downstream of the filter chamber.

* * * * *

UNITED STATES PATENT AND TRADEMARK OFFICE
CERTIFICATE OF CORRECTION

PATENT NO. : 5,123,936

DATED : June 23, 1992

INVENTOR(S) : HERMAN STONE AND GREGORY RUSENKO

It is certified that error appears in the above-identified patent and that said Letters Patent is hereby corrected as shown below:

Column 5, line 18, delete "I" and substitute therefor -- 1 --;

Column 8, line 26, delete "I7" and substitute therefor -- 17 --;

Column 8, line 56, delete "I" and substitute therefor -- 1 --;

Column 9, line 10, after "8" insert a -- . --;

Column 10, line 7, the "W" in the word "were" should be lower case; and

IN THE CLAIMS:

Column 14, line 33, delete "I" and substitute therefor -- 1 --;

Column 15, line 7, delete "I" and substitute therefor -- 1 --;

UNITED STATES PATENT AND TRADEMARK OFFICE
CERTIFICATE OF CORRECTION

PATENT NO. : 5,123,936
DATED : June 23, 1992
INVENTOR(S) : HERMAN STONE AND GREGORY RUSENKO It is certified that error appears in the above-identified patent and that said Letters Patent is hereby corrected as shown below:

Column 15, line 10, delete "I" and substitute therefor -- 1 --; and

Column 18, lines 16-18, delete claim 50 and substitute therefor -- 49. The apparatus of claim 31 in which the means for moving the exhaust air stream comprises one or more vacuum pumps. --.

Signed and Sealed this

Seventh Day of December, 1993

*Attest:*

BRUCE LEHMAN

*Attesting Officer*  Commissioner of Patents and Trademarks